(12) United States Patent
Eigler et al.

(10) Patent No.: US 7,071,444 B2
(45) Date of Patent: Jul. 4, 2006

(54) HIGH PERFORMANCE SYSTEM AND METHOD FOR CAPTURING AND ABSORBING RADIATION

(75) Inventors: Lynne C. Eigler, Simi Valley, CA (US); Yan S. Tam, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 279 days.

(21) Appl. No.: 10/720,772

(22) Filed: Nov. 24, 2003

(65) Prior Publication Data
US 2005/0109737 A1   May 26, 2005

(51) Int. Cl.
B23K 26/00   (2006.01)
(52) U.S. Cl. ..................... 219/121.6; 374/31
(58) Field of Classification Search ............. 219/121.6; 374/31
See application file for complete search history.

(56) References Cited

U.S. PATENT DOCUMENTS

| | | | | |
|---|---|---|---|---|
| 3,034,355 A | * | 5/1962 | Butler | 250/338.1 |
| 3,282,100 A | * | 11/1966 | Baker | 374/32 |
| 3,394,258 A | * | 7/1968 | Schleiger et al. | 250/336.1 |
| 3,464,267 A | * | 9/1969 | Hutcheson, Jr. et al. | 374/32 |
| 3,508,056 A | * | 4/1970 | Fricke | 250/336.1 |
| 3,561,265 A | * | 2/1971 | Schmidt | 374/32 |
| 3,575,048 A | * | 4/1971 | De Benedictis | 136/213 |
| 3,908,457 A | * | 9/1975 | Drong et al. | 374/32 |
| 4,037,470 A | * | 7/1977 | Mock et al. | 374/32 |
| 4,413,916 A | * | 11/1983 | Seguin | 374/32 |
| 4,865,446 A | * | 9/1989 | Inoue et al. | 356/216 |
| 5,758,969 A | * | 6/1998 | Freyaldenhoven | 374/32 |
| 6,493,364 B1 | * | 12/2002 | Baumler et al. | 372/15 |
| 6,572,263 B1 | * | 6/2003 | Refalo et al. | 374/31 |
| 2003/0210465 A1 | | 11/2003 | Valenti | |
| 2003/0231300 A1 | * | 12/2003 | Kramer | 356/213 |

FOREIGN PATENT DOCUMENTS

| | | |
|---|---|---|
| EP | 0 495 569 A2 | 7/1992 |
| JP | 10326931 | 12/1998 |
| JP | 2002214037 | 7/2002 |

* cited by examiner

Primary Examiner—M. Alexandra Elve
(74) Attorney, Agent, or Firm—Robert R. Richardson, P.S.

(57) ABSTRACT

A device for capturing radiation includes multi-axis, multiple chambers with two dimensional geometry. A first chamber has a first axis and is configured to receive a beam of radiation and absorb a portion of the beam of radiation. A second chamber has a second axis that is not collinear with the first axis. The second chamber is configured to receive at least a portion of the beam of radiation and absorb at least a portion of the beam of radiation. In one preferred embodiment, the second chamber terminates at a vertex. Additional chambers may be provided, as desired, with axes not collinear with either the first chamber, the second chamber, or any other chamber such that the plurality of chambers absorb substantially all of the radiation.

33 Claims, 10 Drawing Sheets

HIGH PERFORMANCE SYSTEM AND METHOD FOR CAPTURING AND ABSORBING RADIATION

RELATED APPLICATION

This patent application is related to a concurrently-filed patent application Ser. No. 10/720,650 entitled "Simple High Accuracy High Energy Calorimeter", the contents of which are hereby incorporated by reference.

FIELD OF THE INVENTION

The present invention relates generally to high performance systems for capturing energy and, more specifically, to capturing radiation.

BACKGROUND OF THE INVENTION

Many modern devices are capable of outputting high levels of electromagnetic energy in the form of radiation, such as high-energy lasers and high powered-lamps like solar simulator lamps. In certain circumstances, it is desirable to capture either a portion of or the entire output beam from such devices and, in either case, reduce the back-reflected and/or scattered radiation to zero. When a device is used to simply capture all or part of the radiant energy and no measurements of the beam are performed, such a device is generally referred to as a beam dump.

As a further example, it may be desirable to capture the output energy to measure the output level of the device. Such a measurement may be used to verify output levels of a device stated by a manufacturer or as a diagnostic tool for a radiation source. In this case, the beam capture assembly is generally referred to as a calorimeter or powermeter.

In either of the two cited examples, such a beam capture device must be capable of surviving the input radiation (which may be high power) and must capture substantially all of the radiation. In order to capture substantially all the radiation, the beam capture device should not permit excessive back-scatter, back-reflections or energy leakage, whereby radiation that has entered through an entrance of the beam capture device exits the beam capturing device through the entrance. Likewise, the device should not permit the radiation which has entered through an entrance of the device to escape through other passages.

Currently known beam capture devices may suffer from several shortcomings. For example, some currently known beam capture devices are bulky and heavy. Some current beam capture devices that suffer from this problem include plates that are tilted at large angles, long cones or linear wedges, and devices with torroidal axicon-type construction. Often an attempt is made to use a more compact design that results in local heating issues. The resultant geometry of such devices may, depending upon the level of input radiation, require cooling systems to dissipate the energy. Coolant systems are usually expensive to incorporate, and add to the complexity, bulk, and weight of these beam capture devices.

Further, some currently known beam capture devices are difficult and expensive to fabricate. For example, torroidal axicon devices, decreasing spiral radius devices, spherical devices, and conical devices include complex geometries that are complicated and time-consuming to fabricate.

Some currently known beam capture devices may be alignment sensitive; e.g. the attainment of good performance may require precise alignment. Examples include conical devices, linear wedges, and torroidal axicon devices.

Finally, currently known beam capture devices may exhibit excessive back-scatter or back-reflections. Types of beam capture devices that are subject to excessive back-scatter or back-reflections include tilted and un-tilted plates, cones, torroidal axicon devices, spiral radial devices, and linear wedges.

In an attempt to minimize back-scatter and back-reflections, currently known beam dumps may include a geometry requiring either a very sharp tip or a decreasing radius spiral, such as nautilus shell geometry. However, fabricating beam dumps with very sharp tips or decreasing radius spirals is extremely complicated and, therefore, very expensive.

As a result, there is an unmet need in the art for a beam capture device that is mechanically simple, compact, alignment insensitive, inexpensive to manufacture, requires no external cooling, and has minimal back-scatter and back-reflections.

SUMMARY OF THE INVENTION

The present invention provides high performance systems and methods for capturing radiation. Embodiments of the present invention use a multi-axis, two dimensional geometry to capture the radiation. The multi-axis geometry is very efficient at trapping energy. The geometry minimizes back-reflection and back-scatter by preventing a beam of radiation from directly impinging upon a vertex of the beam capture device and by causing multiple reflections of the beam with each reflection absorbing a predetermined portion of the radiation. The multiple bounces help to establish a more uniform distribution of the energy deposited on the surface and thus eliminate the need for device cooling. As a result, embodiments of the present invention are mechanically simple, compact, alignment insensitive, inexpensive to manufacture, can accommodate a wide range of beam shapes, sizes, and intensities, and have minimal back-reflections and back-scatter.

According to an embodiment of the present invention, a device for capturing radiation includes a first chamber that has a first axis and is configured to receive a beam of radiation. The first chamber is further configured so that a portion of the beam is incident on its walls and partially absorbed in order to attenuate the beam of radiation. A second chamber has a second axis that is not collinear with the first axis. The second chamber is configured to receive at least a portion of the beam of radiation either directly from the input beam or from the beam that has reflected from the walls of the first chamber. The second chamber is configured to further attenuate the beam of radiation, such that substantially all of the radiation is absorbed. In a presently preferred embodiment, the second chamber terminates at a vertex.

According to an aspect of the present invention, the radiation absorbing surfaces within the first and second chambers may be coated with black chrome, Ebonol C™, tungsten, tungsten carbide, silicon carbide, or other suitable absorbing materials.

According to another aspect of the present invention, the first and second chambers may be constructed of a high thermal conductivity material such as copper.

According to a further aspect of the present invention, the beam of radiation may include a coherent radiation source such as a laser beam or an incoherent source such as a lamp. However, with a suitable choice of size and materials, the device will work with any radiation source.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
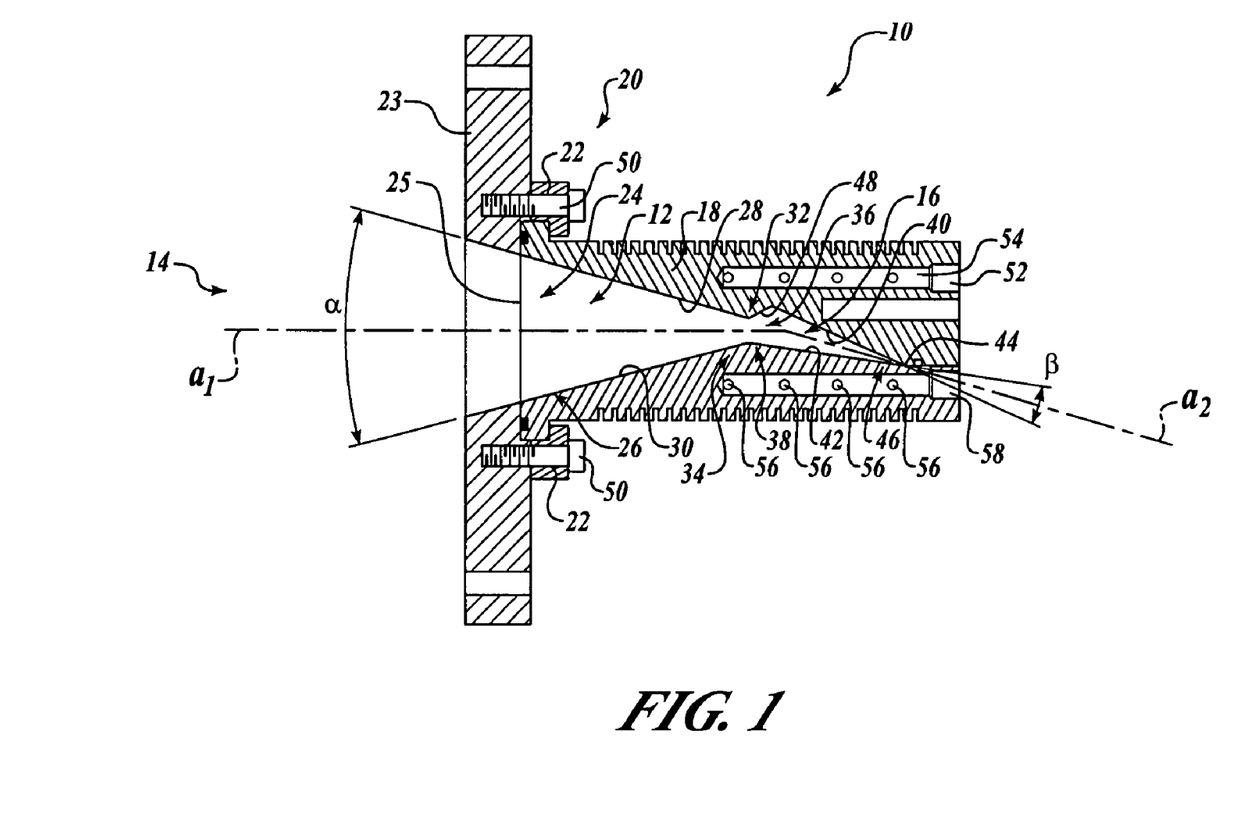
FIG. 1 is a full cutaway side view of an exemplary beam capture and absorbing device according to an embodiment of the present invention.

By way of overview and referring to FIG. 1, a beam capture device 10, such as a beam dump, is provided for capturing radiation, such as without limitation a laser beam or output of a high power lamp such as a solar simulator lamp. A first chamber 12 has a first axis $a_1$ and is configured to receive a beam 14 of radiation. The first chamber 12 is further configured to attenuate the beam 14 and direct a portion of the beam 14 into a second chamber 16. The portion of the beam 14 directed into the second chamber 16 may range up to 100% of the beam. The second chamber 16 has a second axis $a_2$ that is not collinear with the first axis $a_1$. The second chamber 16 is configured to receive at least a portion of the beam 14. The second chamber 16 is further configured to further attenuate at least a portion of the beam 14, such that the two chambers 12 and 16 together absorb or otherwise capture substantially all of the radiation. Details of embodiments of the present invention will now be set forth below.

The first and second chambers 12 and 16 are provided within a body 18. In one presently preferred embodiment, the body 18 is a copper body. However, it will be appreciated that the body 18 may be made of other high conductivity materials, as desired, such as without limitation aluminum, beryllium, molybdenum, silicon carbide, or steel.

In addition to the first and second chambers 12 and 16, if desired the body 18 may include other features to create a high-energy calorimeter. Features of a high-energy calorimeter that may be advantageously included with the body 18, along with the first and second chambers 12 and 16, are set forth in a concurrently filed U.S. patent application Ser. No. 10/720,650 entitled "Simple High Accuracy High Energy Calorimeter", the contents of which are hereby incorporated by reference.

While the beam capture device 10 is well suited for capturing and absorbing radiation, the energy content of which is measured with a high-energy calorimeter, it will be appreciated that the beam capture device 10 need not be associated with a high energy calorimeter. For example, it will be appreciated that the beam capture device 10 suitably functions as a beam dump when used without instrumentation in addition to functioning in concert with a high-energy calorimeter.

In one exemplary embodiment of the device 10, a mounting clamp 20 extends from the body 18. The clamp 20 permits the body 18 to be attached, via any suitable fasteners 50, through bores 22 defined in the clamp 20 to a support structure 23. The support structure 23 might be the outlet port for the source of the beam 14.

The first chamber 12 defines an opening 24 at a first end 26 of the first chamber 12. The opening 24 defines an aperture 25 in the body 18 that advantageously is sized to admit the entire beam 14. In one presently preferred embodiment, the opening 24 is larger than a footprint of the beam 14.

First and second faces 28 and 30 extend from the first end 26 to a throat 32 at a second end 34 of the first chamber 12. The first and second faces 28 and 30 define an angle $\alpha$ between them. The first and second faces 28 and 30 narrow at the angle a along the axis $a_1$ from the first end 26 to the throat 32 at the second end 34. The angle $\alpha$ suitably has any value as desired for a particular application. However, given by way of non-limiting example, in one embodiment the angle $\alpha$ has a value of around 28°. In another exemplary embodiment, given by way of non-limiting example the angle $\alpha$ suitably may have a value of around 32°. While it is emphasized that the angle $\alpha$ may be selected to have any angle as desired, the non-limiting values given above for the angle $\alpha$ have been determined to attenuate a prescribed amount of energy of the beam 14 while minimizing backscatter and back-reflection.

In one presently preferred embodiment, the first and second faces 28 and 30 are desirably coated in order to promote absorption of energy of the beam 14. However, the device geometry is established such that the surfaces absorb the energy over a large area. This helps minimize local heating and helps ensure that any local heating is safely below the material limits of the device 10. Angling and coating the first and second faces 28 and 30 minimizes local heating of any surface within the beam capture device 10 by allowing a prescribed amount of the beam's energy to be absorbed in the first chamber 12 and the remainder to be absorbed in the second chamber 16. This is accomplished by selecting a coating with the appropriate absorption coefficient versus angle characteristics for the coating applied to the first and second faces 28 and 30. If the absorption coefficient of the coating is too low then the majority of the beam absorption must occur in the second chamber 16. For a high power beam, this may cause unacceptable 'hot spots' on the surfaces of the second chamber 16. Similarly, if the absorption coefficient of the coating is too high, the amount of energy absorption that occurs in the first reflection may be unacceptably high and again result in local 'hot spots.' In one present embodiment, the first and second faces 28 and 30 are coated with a coating of Ebonol C™. It will be appreciated that, depending on the specific application, other coatings or no coating may be used as desired on the first and second faces 28 and 30. Given by way of non-limiting example, other suitable coatings that may be used on the first and second faces 28 and 30 include tungsten, tungsten carbide, silicon carbide, black chrome, black nickel, black oxide, black paint, and the like.

The second chamber 16 defines an opening 36 at a first end 38. The opening 36 is configured to admit a portion of the beam 14 through the throat 32. It will be appreciated that portions of the beam 14 that reflect off the first or second face 28 and 30 may also be admitted through the opening 36. Third and fourth faces 40 and 42 define an angle $\beta$ therebetween. The third and fourth faces 40 and 42 narrow at the angle $\beta$ along the axis $a_2$ to a vertex 44 at a second end 46. Similar to the angle $\alpha$, the angle $\beta$ suitably can have any value as desired. In one present embodiment, the angle $\beta$ advantageously has a value of around 15°. It has been determined that a value of around 15°, in concert with values of either around 28° or around 32° for the angle α, advantageously attenuates substantially all of the energy of the beam 14 and minimizes local heating, back-scatter and back-reflections. However, it is emphasized that the angle β may have any value as desired for a particular application. Similar to the first and second faces 28 and 30, the third and fourth faces 40 and 42 suitably are also coated in order to mitigate effects of excessive local absorption and heating of the beam capture device 10 while promoting a controlled absorption of the energy from the beam 14. As such, given by way of non-limiting example, the third and fourth faces 40 and 42 suitably may be coated with Ebonol C™, tungsten, tungsten carbide, silicon carbide, black chrome, black oxide, black paint, or the like, as desired.

If desired, the second chamber 16 may optionally include additional faces such as a fifth face 48. If provided, the fifth face 48 may extend from the end of the first face 28 at the second end 34 of the first chamber 12 to the end of the third face 40 at the first end 38 of the second chamber 16. If desired, the fifth face 48 may be provided to provide a greater amount of non-collinearity between the axes $\alpha_1$ and $\alpha_2$. Advantageously, within certain limits, increasing the amount of non-collinearity between the axis $\alpha_1$ and $\alpha_2$ mitigates even further any amount of back-scatter or back-reflection. The fifth face 48 suitably may be coated with the same coating as the first, second, third, and fourth faces 28, 30, 40, and 42, respectively, as discussed above.

Figure 2:
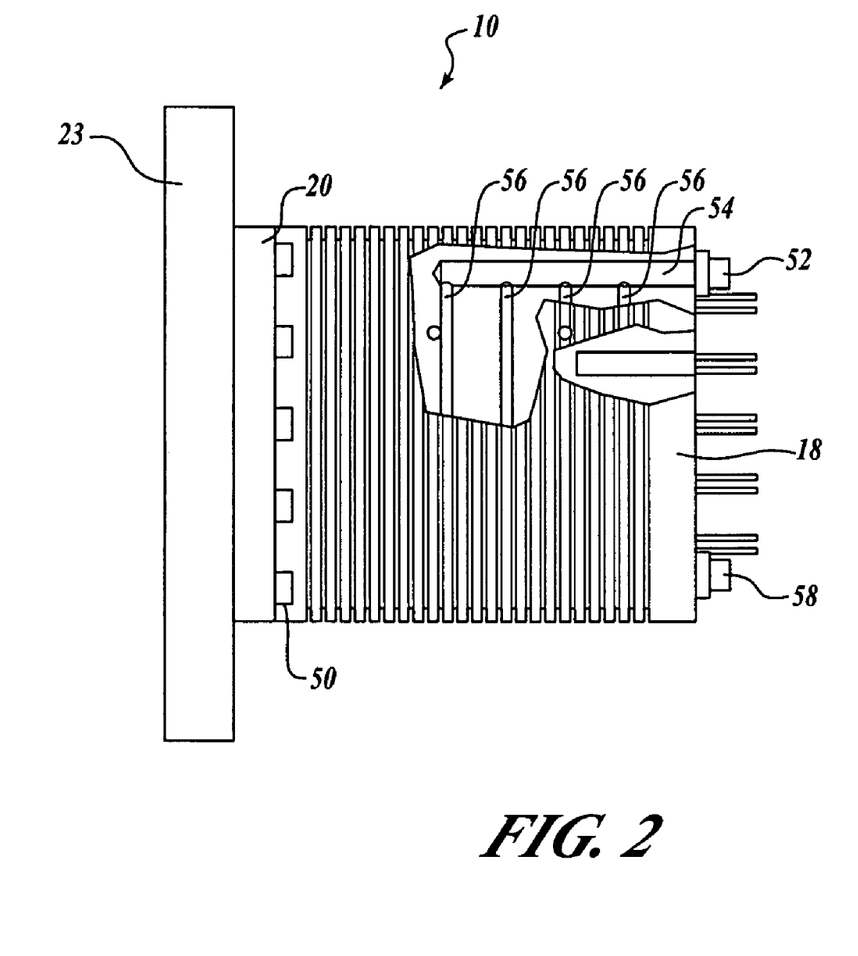
FIG. 2 is a partial cutaway top plan view of the beam capture and absorbing device of FIG. 1.

Referring now to FIG. 2, a plurality of fasteners 50 extend through the clamp 20 and attach the beam capture device 10 to the support structure 23, such as an outlet port (not shown) of a device (not shown) for generating the beam of radiation.

The beam capture device 10 is designed to work without subjecting the body 18 to substantial local heating and to do so without active cooling. Yet because the beam capture device 10 will capture and absorb substantially all of the energy of the beam 14, there may be circumstances where it may be desirable to cool the beam capture device 10. Such cooling may be desired after use in order to return the body of the device 10 to the starting temperature so that it may be used again. If the input energy is high enough, successive runs without either active cooling or sufficient time for passive cooling may drive the bulk temperature of the device 10 above the melting temperature of the materials. Further, if the input energy is high enough, the device 10 may reach temperatures that pose a safety hazard to personnel or equipment.

In one exemplary embodiment, an inlet port 52 is arranged to be coupled to receive any acceptable coolant from a cooling system (not shown). An inlet header 54 extends into the body 18 and supplies coolant to a plurality of coolant channels 56 that extend throughout the body 18. The coolant channels 56 connect to an outlet header (not shown) that terminates at an outlet port 58. Cooling may be performed while the device 10 is exposed to radiation, after exposure to radiation, or both. It will be appreciated that any acceptable cooling system known in the art may be used to remove heat from the body 18. However, an exemplary cooling system that is well suited for use with the beam capture device 10 is set forth in concurrently filed U.S. patent application Ser. No. 19/720,650 entitled "Simple High Accuracy High Energy Calorimeter", the contents of which are hereby incorporated by reference.

Figure 3:
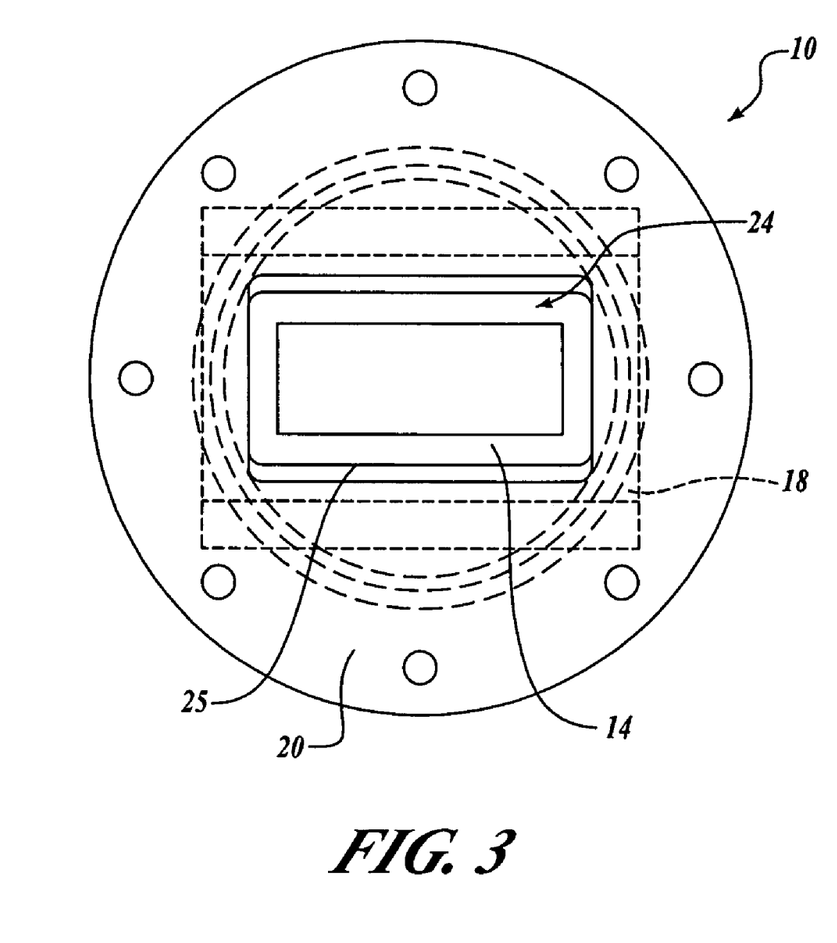
FIG. 3 is an end view looking into an entrance of the beam capture and absorbing device of FIG. 1.

Referring now to FIG. 3, the opening 24 advantageously defines an aperture 25 in the body 18 that is larger than a footprint of the beam 14. It will be appreciated that the opening 24 suitably defines the aperture 25 with any size as desired for a particular application. In one presently preferred embodiment, the aperture 25 advantageously is defined to be at least as large as the footprint of the beam 14. Given by way of non-limiting example, the beam 14 suitably may have a footprint of around 4 cm (height) by around 4 cm (width) to around 4 cm (height) by around 12 cm (width). Advantageously, in one embodiment the opening 24 defines the aperture 25 to be around 6 cm (height) by around 13 cm (width). However, it will be appreciated that the opening 24 may define the aperture 25 to have any dimensions as desired. While actual dimensions are understood not to be a limitation of the present invention, it will be appreciated that it is desirable that the aperture 25 be larger than the footprint of the beam 14 such that the entire beam 14 is admitted into the first chamber 12.

It will be appreciated that size of the footprint of the beam 14, along with power level of the beam 14, determines a duration that the beam 14 may illuminate the attenuation device 10. As discussed above, in one exemplary embodiment the footprint of the beam 14 may range in size from around 4 cm by around 4 cm to around 4 cm by around 12 cm. Given by way of non-limiting example, with an exemplary power level of 32 kW, the beam 14 can be applied for a duration of around five seconds when the footprint of the beam 14 is around 4 cm by around 4 cm. Assuming the same power level, the duration of the beam 14 can be around 10 seconds when the beam 14 has a footprint of around 4 cm by around 8 cm. Again assuming the same power level, the beam 14 can have a duration of over 10 seconds when the footprint of the beam 14 is around 4 cm by around 12 cm. It will be appreciated that a larger footprint for the beam 14 spreads out energy of the beam 14 over a larger area along the first, second, third, and fourth faces 28, 30, 40, and 42 and, if desired, the fifth face 48. Spreading out the energy of the beam 14 reduces localized heating. As a result, for a given power level the beam 14 can be applied for longer durations of time.

Figure 4:
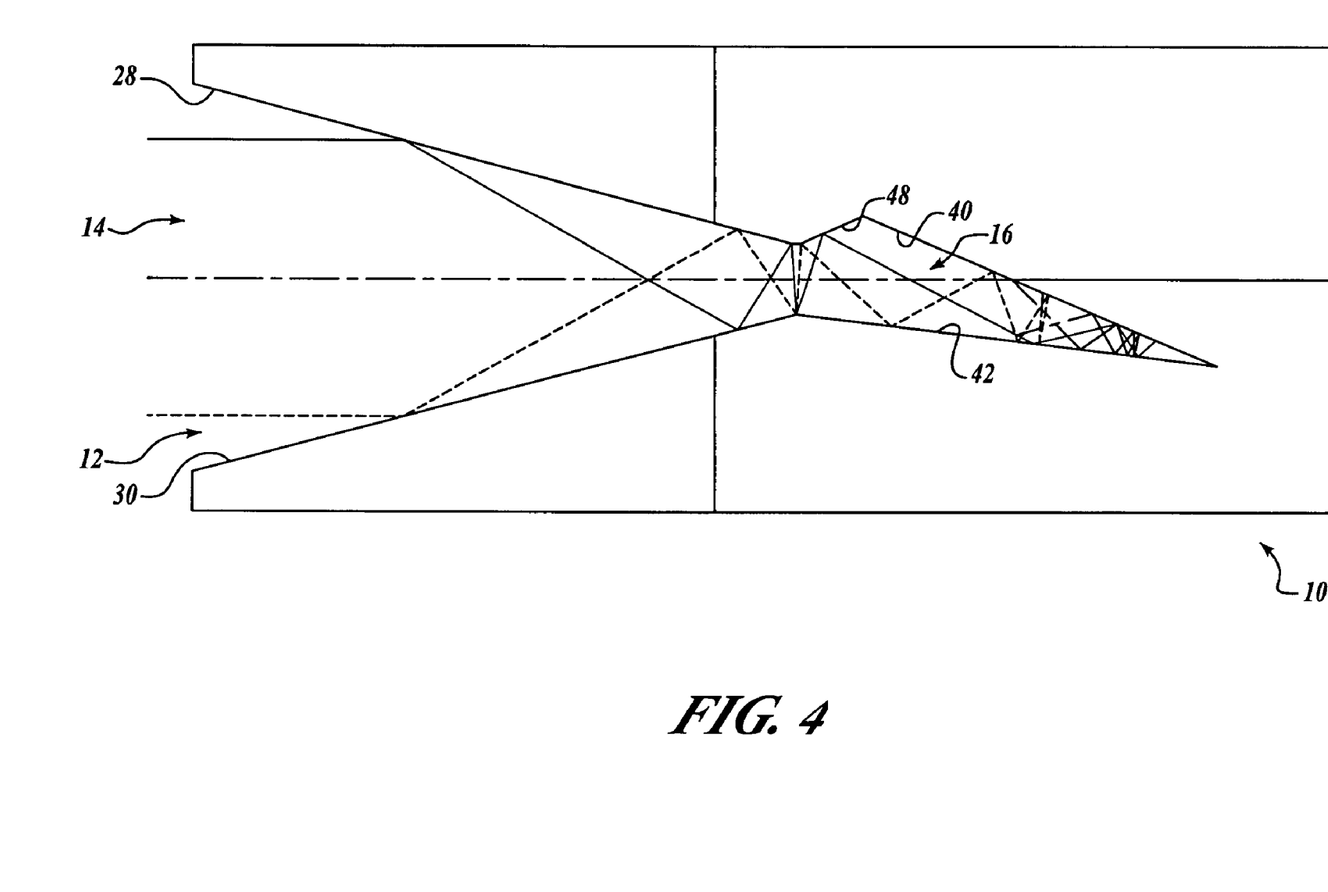
FIGS. 4–6 illustrate particular features of the beam capture and absorbing device of FIG. 1.
Figure 5:
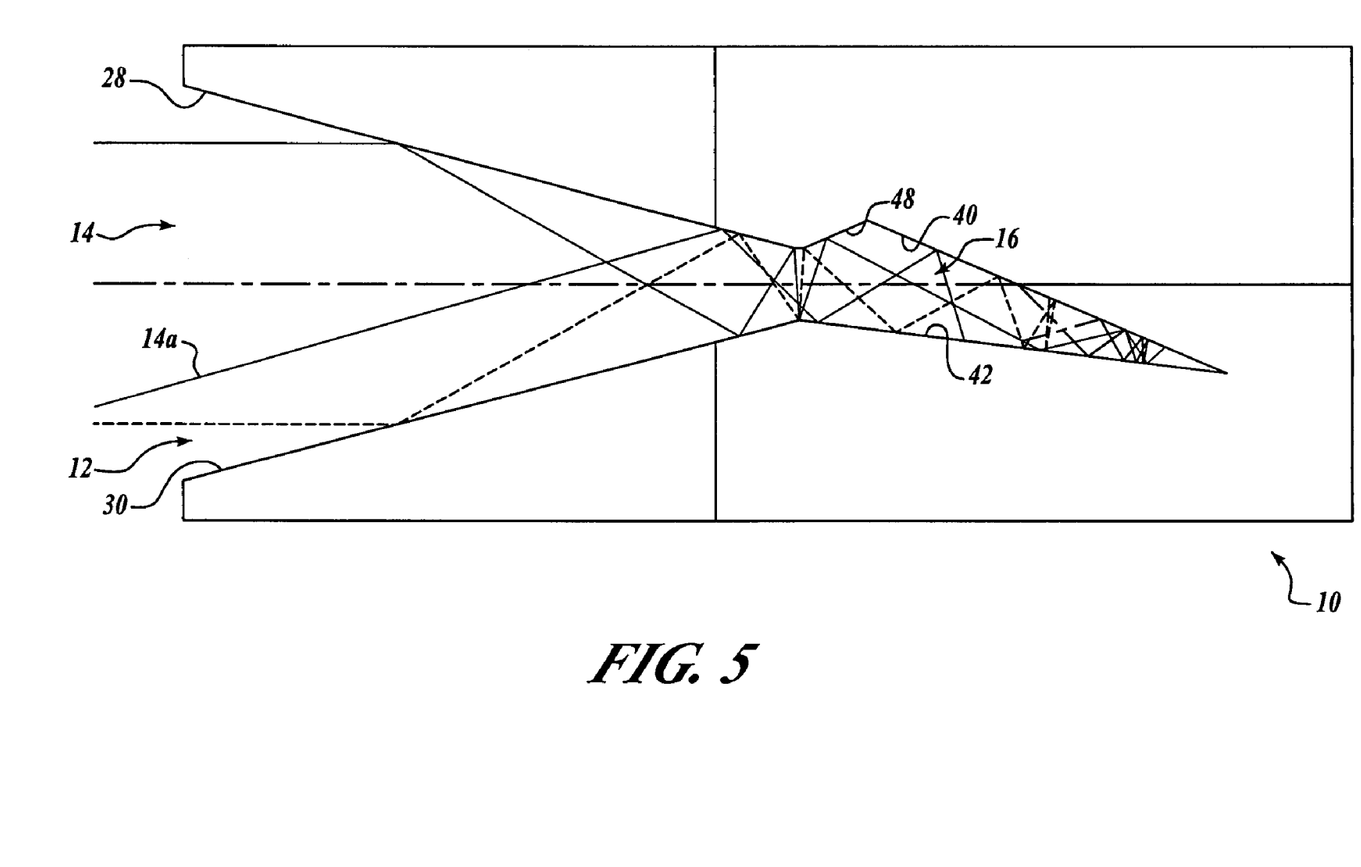
Figure 6:
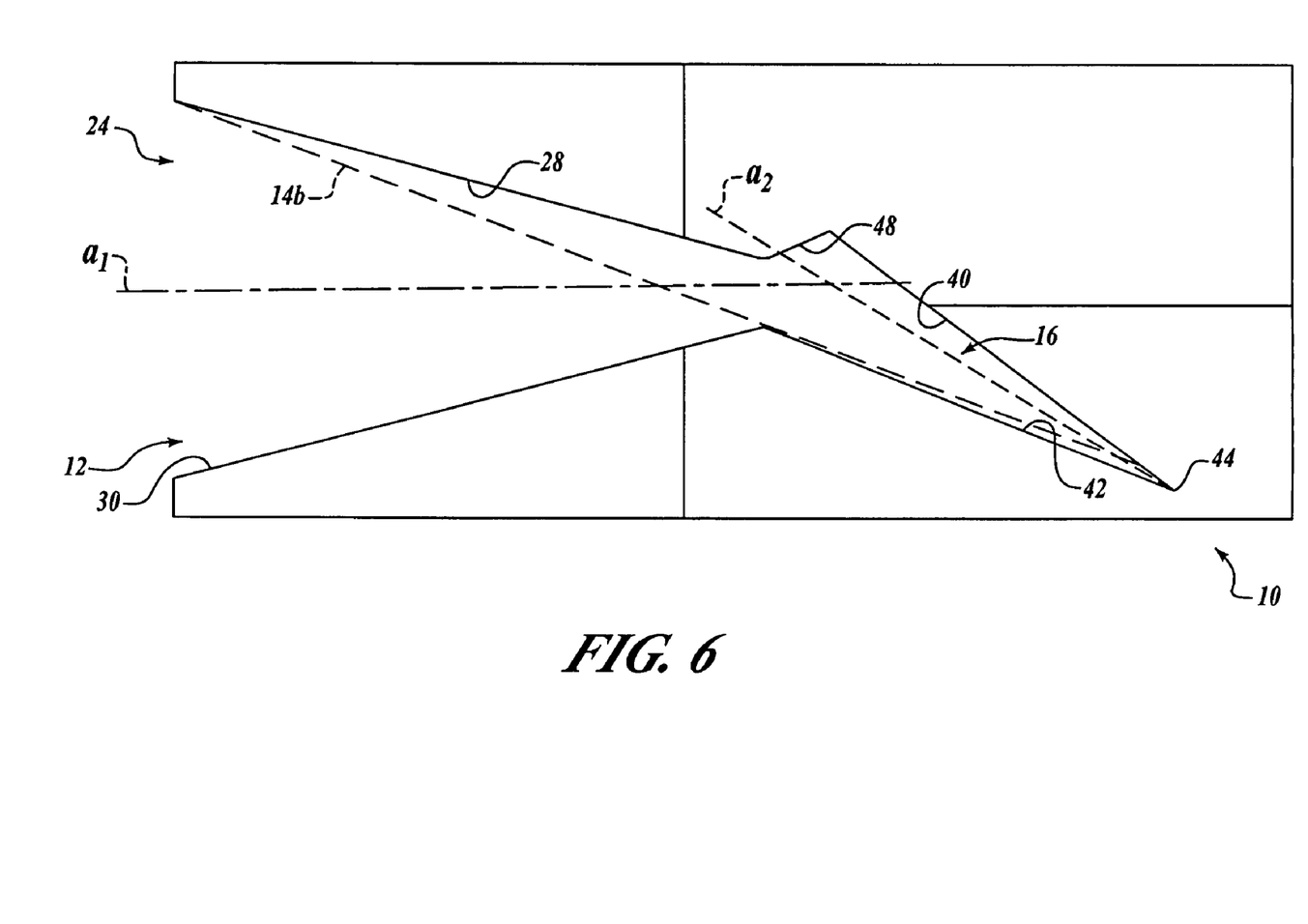

Referring now to FIGS. 4–6, when the beam 14 enters the beam capture device 10, the beam 14 undergoes multiple reflections, or "bounces," off the first and second faces 28 and 30 in the first chamber 12 and the faces 40 and 42 in the second chamber 16 before substantially all energy of the beam 14 is absorbed. Each reflection absorbs some of the energy of the beam 14. Referring now to FIG. 5, even beams entering the device 10 at a large angle, such as a beam 14*a*, advantageously are captured by the device 10.

Referring now to FIG. 6, in a presently preferred embodiment, advantageously there is no direct path from the opening 24 to the vertex 44. For example, a beam 14*b* enters the opening 24 at the end of the first face 28 and directly enters the second chamber 16 at the end of the fourth face 42. As such, this represents the steepest possible beam angle that can enter the second chamber 16. Advantageously and according to the present invention, the axis $a_2$ is selected such that the beam 14*b* does not directly impinge the vertex 44. Instead, the axis $a_2$ is selected such that the beam 14*b* reflects off the third face 40 at least once before the beam 14*b* impinges upon the vertex 44. Advantageously, this geometry prevents unimpeded backscatter and reflection of the beam 14*b* from the vertex 44 directly out of the opening 24.

Figure 7:
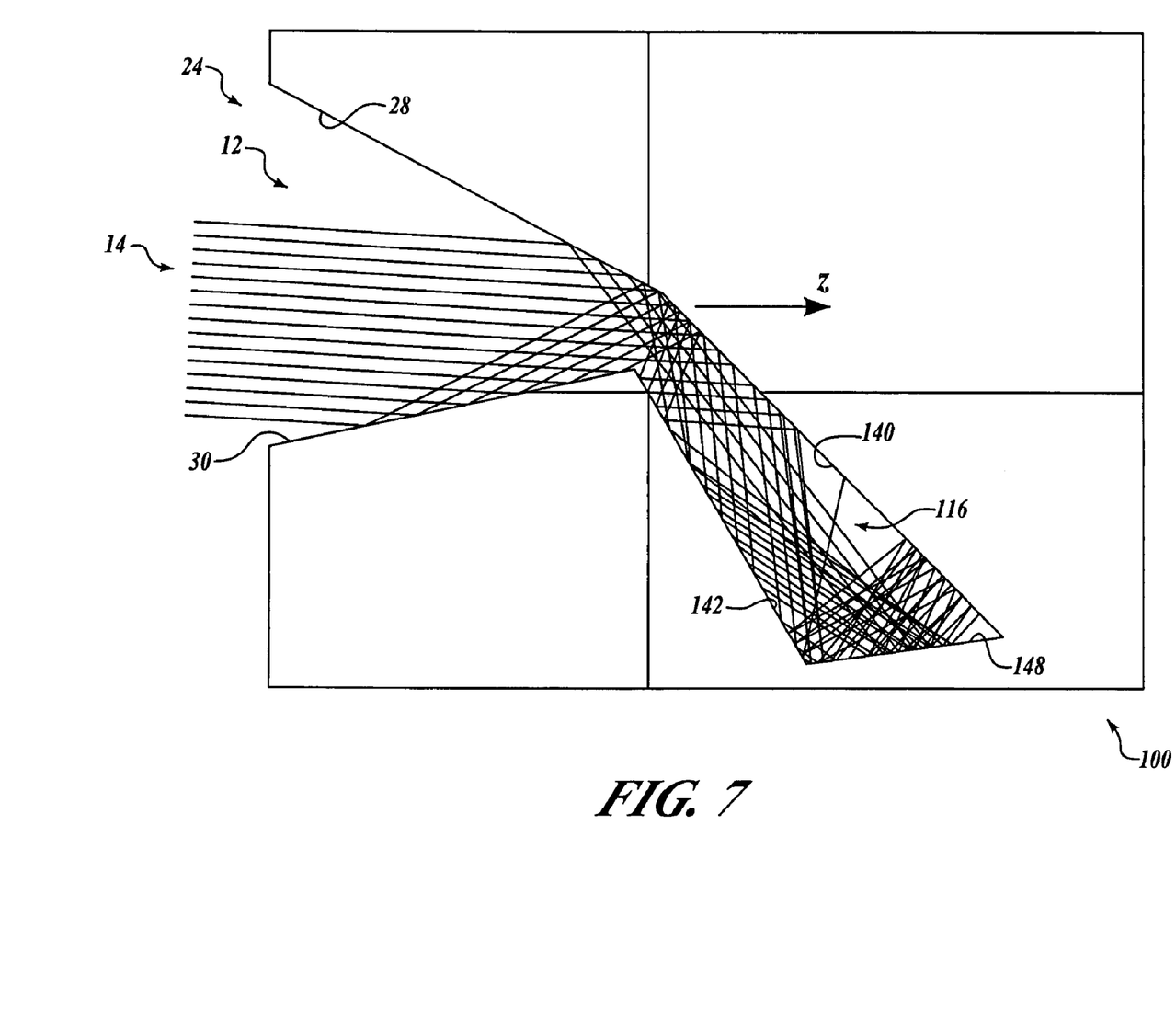
FIGS. 7 and 8 are illustrations of capture devices according to alternate embodiments of the present invention.

It will be appreciated that exemplary geometries of the device 10 shown in FIGS. 1–6 are given by way of non-limiting example and are not intended to limit whatsoever any possible geometries contemplated by the present invention. For example, referring now to FIG. 7, a device 100 having an alternate geometry includes the first chamber 12 and the first and second faces 28 and 30 as described above. While the device 100 includes a second chamber 116 with third, fourth, and fifth faces 140, 142, and 148, the second chamber 116 does not terminate in a single vertex. The device 100 accordingly captures the beam 14 and significantly reduces backscatter and reflections that may exit the entrance 24. However, it will be appreciated that the device 100 may be subject to more local beam concentrations and resultant local heating than the device 10 (FIGS. 1–6).

Figure 8:
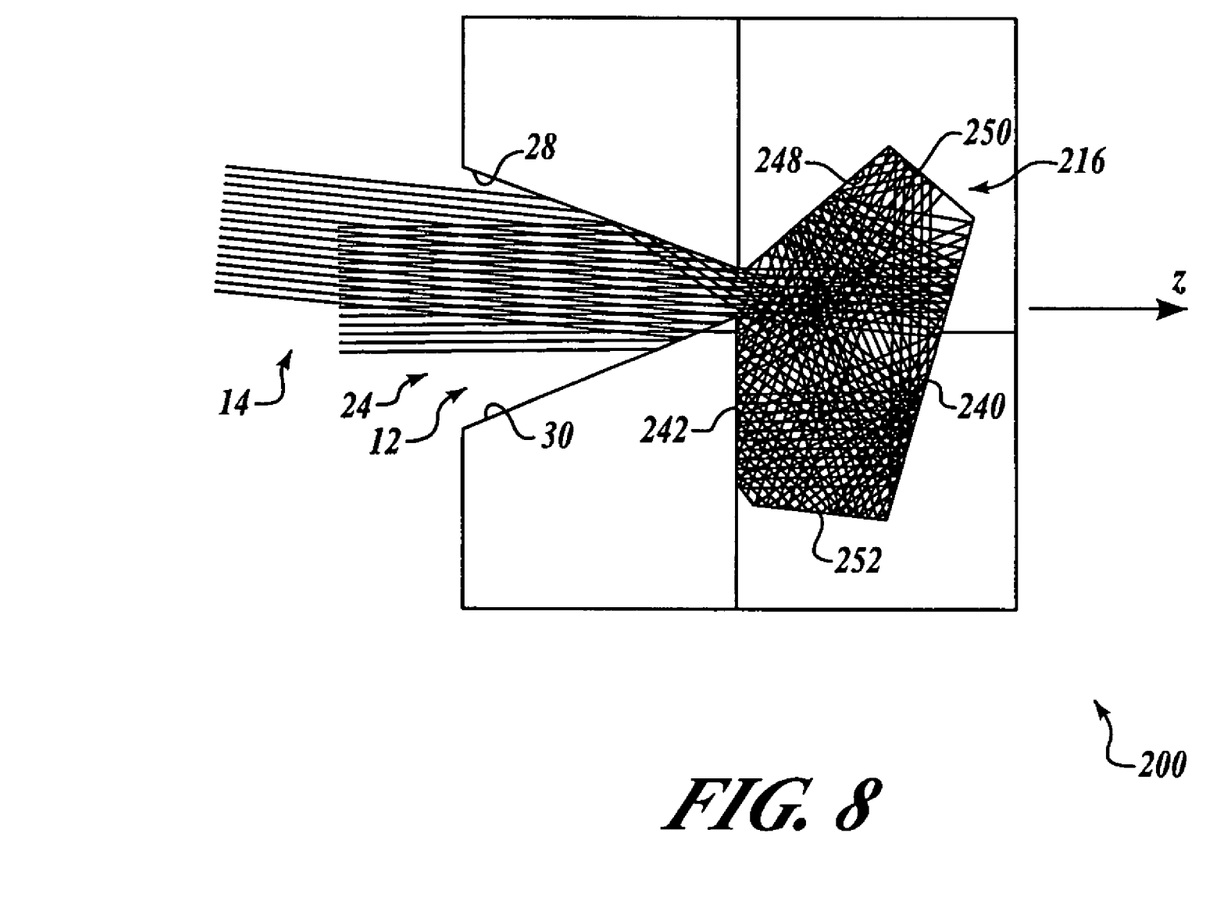

Referring now to FIG. 8, a device 200 with another alternate geometry includes the first chamber 12 and the first and second faces 28 and 30 as described above. Like the device 100 (FIG. 7), the device 200 includes a second chamber 216 that does not terminate at a vertex. However, the second chamber 200 is a five-sided chamber with third, fourth, fifth, sixth, and seventh faces 240, 242, 248, 250, and 252. Because of the high number of sides in the second chamber 216, substantially all of the energy of the beam 14 is captured. For example, it has been determined that when a beam 14 with a power rating of 100 watts is put into the device 200, only about 0.00043 watts (that is, 0.0004%) exits the device 200.

Figure 9:
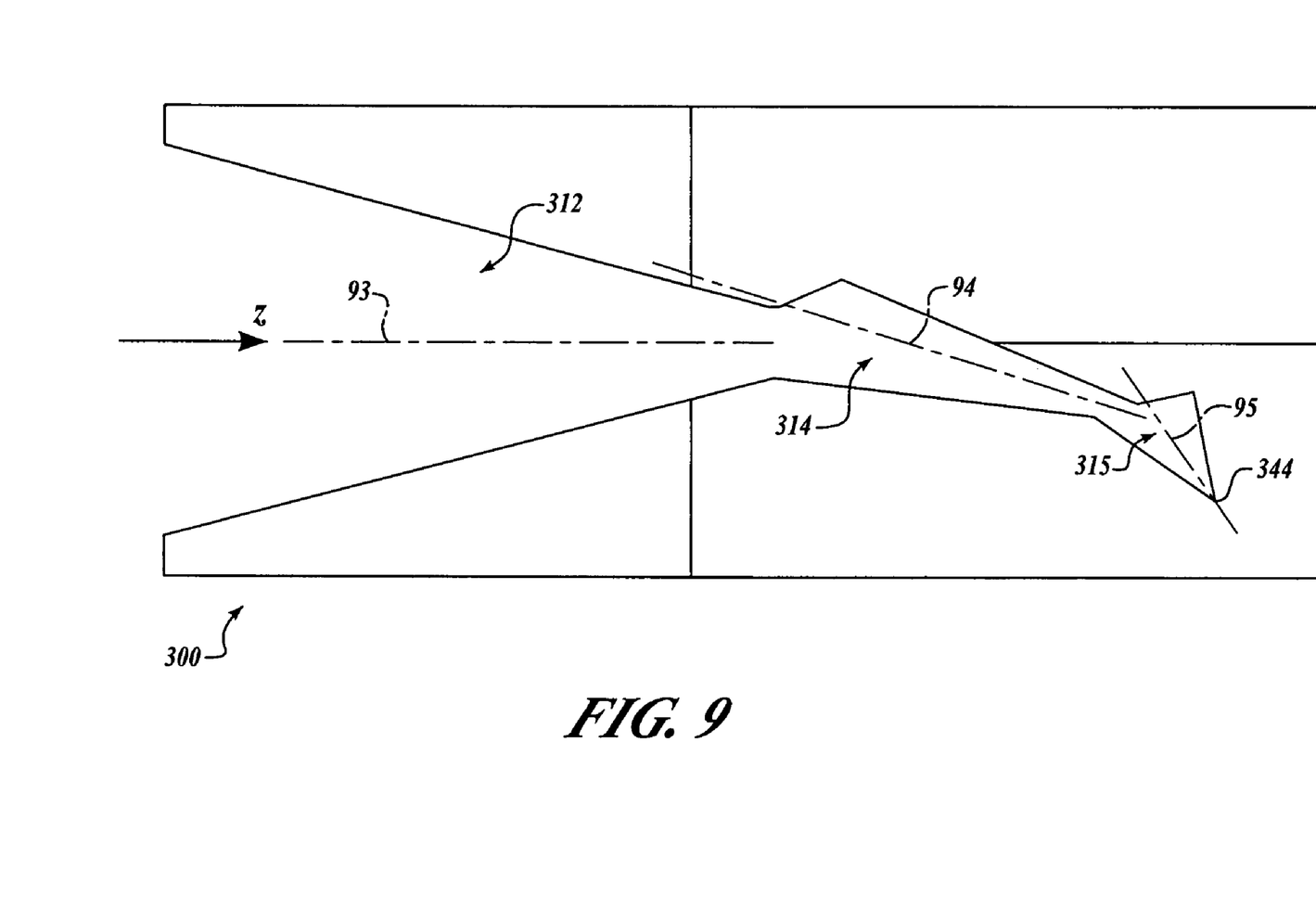
FIGS. 9 and 10 are illustrations of capture devices according to further alternate embodiments of the present invention.
Figure 10:
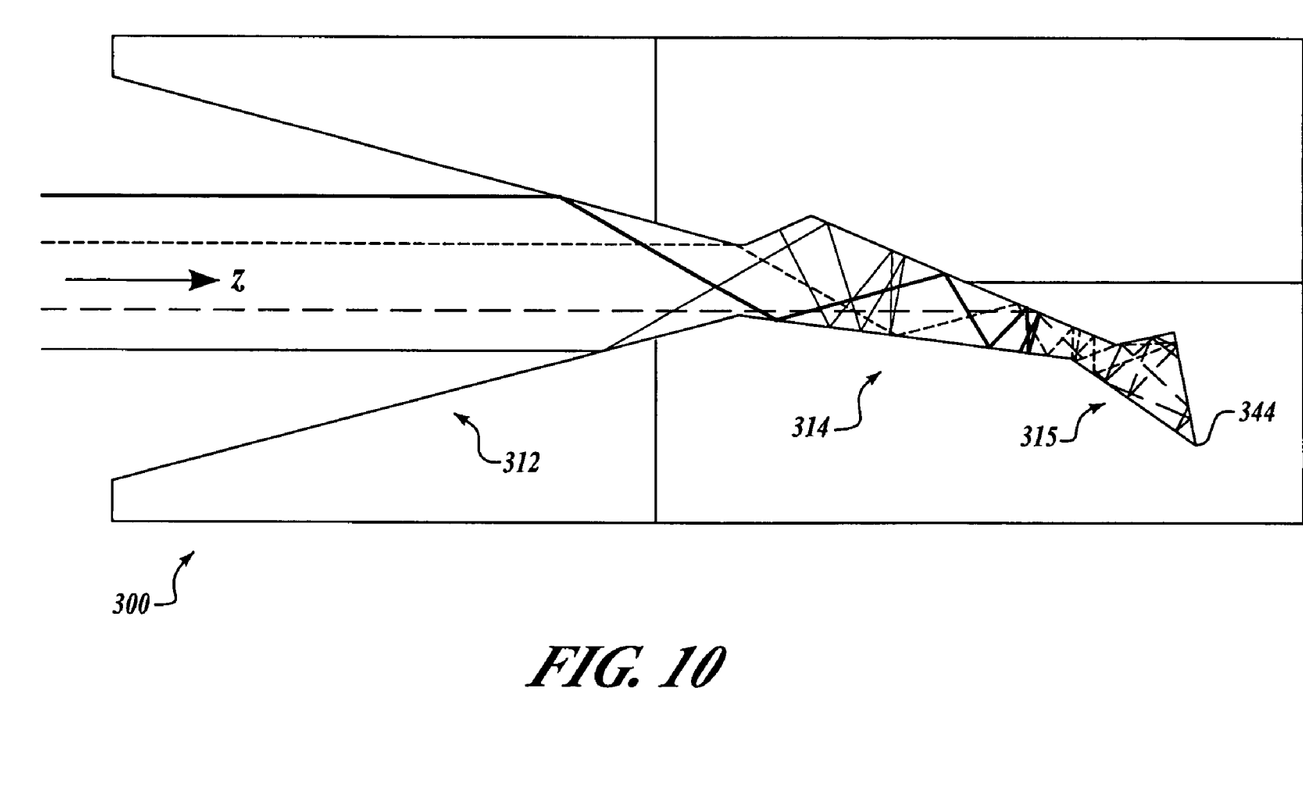

It will be appreciated that embodiments of the present invention need not be limited to devices with only two chambers. For example, referring now to FIG. 9, a device 300 given by way of nonlimiting example includes first, second, and third chambers 312, 314, and 315 having non-collinear axes $a_3$, $a_4$, and $a_5$, respectively. The third chamber 315 terminates at a vertex 344. Further details of construction of the device 300 (such as materials, coatings, and faces) are similar to details of construction set forth above for the devices 10, 100, and 200 and need not be repeated for an understanding of the present invention. Referring now to FIG. 10, it will be appreciated that there is no direct path to the vertex 344. Because the device 300 includes more chambers and faces than does the device 10 (FIGS. 1 and 6), the device 300 advantageously reduces backscatter even more than does the device 10. However, it will be appreciated that, as a tradeoff, the device 300 may entail more complicated fabrication than does the device 10.

It will further be appreciated that embodiments of the present invention may include devices having geometries with any number of chambers and faces as desired. As seen above in the nonlimiting example of the device 300, backscatter becomes further reduced with an increase in the number of chambers defined within the device. These further reductions in backscatter may come at an expense of possible complications in fabrication as more chambers are defined within the device.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A device for capturing radiation, the device comprising:
   a first chamber having a first axis and being configured to receive a beam of radiation, the first chamber being further configured to absorb the beam of radiation; and
   a second chamber having a second axis that is not collinear with the first axis, the second chamber being configured to receive at least a portion of the beam of radiation, the second chamber being further configured to further absorb at least the portion of the beam of radiation, such that substantially all of the radiation is absorbed.

2. The device of claim 1, wherein the second chamber terminates at a vertex.

3. The device of claim 1, wherein the first chamber has a first end that defines an opening configured to admit the beam of radiation.

4. The device of claim 3, wherein the first chamber further defines first and second faces.

5. The device of claim 4, wherein the second chamber further defines third and fourth faces.

6. The device of claim 5, wherein the first, second, third, and fourth faces are coated with one of tungsten, tungsten carbide, and silicon carbide.

7. The device of claim 4, wherein the first and second faces define a first angle therebetween, and the third and fourth faces define a second angle.

8. The device of claim 7, wherein the first angle is around 28° and the second angle is around 15°.

9. The device of claim 7, wherein the first angle is around 32° and the second angle is around 15°.

10. The device of claim 1, wherein the first and second chambers are surrounded by a copper body.

11. The device of claim 1, wherein the beam of radiation includes a laser beam.

12. A device for capturing radiation, the device comprising:
    a first chamber having a first end that defines an opening configured to admit a beam of radiation, the first chamber narrowing toward a second end along a first axis: and
    a second chamber having a first end that defines an opening configured to receive at least a portion of the beam of radiation from the first chamber, the second chamber narrowing toward a vertex at a second end along a second axis that is not collinear with the first axis.

13. The device of claim 12, wherein the first chamber defines first and second faces.

14. The device of claim 13, wherein the second chamber defines a third face and at least a fourth face.

15. The device of claim 14, wherein the first, second, third, and at least fourth faces are coated with one of tungsten, tungsten carbide, and silicon carbide.

16. The device of claim 13, wherein the first and second faces define a first angle therebetween, and the third and fourth faces define a second angle therebetween.

17. The device of claim 16, wherein the first angle is around 28° and the second angle is around 15°.

18. The device of claim 17, wherein the first angle is around 32° and the second angle is around 15°.

19. The device of claim 12, wherein the first and second chambers are surrounded by a copper body.

20. The device of claim 12, wherein the beam of radiation includes a laser beam.

21. A device for capturing radiation, the device comprising:
    a first chamber having a first end that defines a first opening configured to admit a beam of radiation, the first chamber defining first and second faces that define a first angle therebetween along a first axis; and
    a second chamber having a first end that defines a second opening configured to receive at least a portion of the beam of radiation from the first chamber, the second chamber defining a third face and at least a fourth face that define a second angle therebetween along a second axis that is not collinear with the first axis, the third and at least fourth faces terminating at a vertex.

22. The device of claim 21, wherein the first, second, third, and at least fourth faces are coated with one of tungsten, tungsten carbide, and silicon carbide.

23. The device of claim 21, wherein the first angle is around 28° and the second angle is around 15°.

24. The device of claim 21, wherein the first angle is around 32° degrees and the second angle is around 15°.

25. The device of claim 21, wherein the first and second chambers are surrounded by a copper body.

26. The device of claim 21, wherein the beam of radiation includes a laser beam.

27. The device of claim 21, wherein the second chamber further defines a fifth face intermediate the first face and the third face.

28. A method of capturing radiation, the method comprising:
   receiving a beam of radiation in a first chamber having a first axis;
   absorbing a portion of the beam of radiation in the first chamber;
   receiving at least a portion of the beam of radiation is a second chamber having an axis that is not collinear with the first axis; and
   absorbing at least the portion of the beam of radiation in the second chamber, such that substantially all of the beam of radiation is absorbed.

29. The method of claim 28, wherein attenuating the beam of radiation in the first chamber includes bouncing the beam of radiation off first and second faces that define a first angle therebetween.

30. The method of claim 29, wherein attenuating at least the portion of the beam of radiation in the second chamber includes bouncing at least the portion of the beam of radiation off a third face and at least a fourth face that define a second angle therebetween.

31. The method of claim 30, further comprising coating the first, second, third, and at least fourth faces with one of tungsten, tungsten carbide, and silicon carbide.

32. The method of claim 28, wherein the first and second chambers are surrounded by a copper body.

33. The method of claim 28, wherein the beam of radiation includes a laser beam.

* * * * *